United States Patent
Huang et al.

(10) Patent No.: US 12,454,815 B2
(45) Date of Patent: Oct. 28, 2025

(54) MULTIFUNCTIONAL FAUCET

(71) Applicant: Clement Inc., Flushing, NY (US)

(72) Inventors: Lengjie Huang, Wuhan (CN); Yongqiang Yan, Shanghai (CN)

(73) Assignee: CLEMENT INC., Flushing, NY (US)

( * ) Notice: Subject to any disclaimer, the term of this patent is extended or adjusted under 35 U.S.C. 154(b) by 108 days.

(21) Appl. No.: 18/401,597

(22) Filed: Dec. 31, 2023

(65) Prior Publication Data

US 2025/0171988 A1 May 29, 2025

(30) Foreign Application Priority Data

Nov. 28, 2023 (CN) .......................... 202323247891.4

(51) Int. Cl.
*E03C 1/04* (2006.01)
(52) U.S. Cl.
CPC .......... *E03C 1/0405* (2013.01); *E03C 1/0402* (2013.01); *E03C 1/0403* (2013.01)
(58) Field of Classification Search
CPC ............................................. E03C 1/04–0412
See application file for complete search history.

(56) References Cited

U.S. PATENT DOCUMENTS

| | | | |
|---|---|---|---|
| 2021/0102360 A1* | 4/2021 | Tzeng | F16K 19/006 |
| 2022/0064920 A1* | 3/2022 | Zhang | F16K 11/22 |
| 2022/0145600 A1* | 5/2022 | Tueshaus | E03C 1/0405 |
| 2023/0193606 A1* | 6/2023 | Tracy | E03C 1/0412 |
| | | | 4/678 |
| 2024/0368863 A1* | 11/2024 | Lee | E03C 1/0404 |

* cited by examiner

*Primary Examiner* — Christine J Skubinna

(57) ABSTRACT

The present disclosure provides multifunctional faucet. The multifunctional faucet comprises a main body component, a control component located on the main body component, a connection component connected at the bottom of the main body component, a water outlet component, and a switching component located at water outlet of the main body component. The main body component, comprising a water passage and at least two outlet passages respectively connected to the water passage. The control component is used to turn on or turn off the multifunctional faucet. When the multifunctional faucet is turned on by the control component, the switching component controls the water flowing from the water passage to one of the at least two outlet passages and then flowing out of the water outlet component, thereby differing the outflow water flow.

12 Claims, 11 Drawing Sheets

MULTIFUNCTIONAL FAUCET

TECHNICAL FIELD

The present disclosure relates to a multifunctional faucet.

BACKGROUND

At present, the functions of faucets on the present market are relatively single, usually only having one form of water outlet. However, the use of faucets is actually diverse, such as face washing, hand washing, tooth brushing, etc. Different methods of uses have different requirements for water flow patterns, and a single water outlet form cannot meet the diverse needs of users. Therefore, faucets with multiple water outlet forms have emerged.

SUMMARY OF THE DISCLOSURE

The present disclosure provides a multifunctional faucet, comprising:
  a main body component, a control component located on the main body component, a connection component connected at the bottom of the main body component, a water outlet component, and a switching component located at water outlet of the main body component;
  the main body component, comprising a water passage and at least two outlet passages respectively connected to the water passage;
  the control component is used to turn on or turn off the multifunctional faucet;
  when the multifunctional faucet is turned on by the control component, the switching component controls the water flowing from the water passage to one of the at least two outlet passages and then flowing out of the water outlet component, thereby differing the outflow water flow.

In some embodiments, the switching component comprises a button, a support arm, a water distribution element, a switching shaft, a first spring and a sealing element; the button connects to one end of the support arm, and protrudes out of the front surface of the main body component; the water distribution element is located and fixed between the water passage and the at least two outlet passages; the sealing element is located on the end of the switching shaft away from the button; the switching shaft connects to other end of the support arm, and movably runs through the water distribution element in order to connect the water passage to one of the least two outlet passages; the first spring presses the switching shaft towards to the button.

In some embodiments, the main body component comprises an outer body, a valve core, a valve core platform and inner body located in the outer body, the outer body comprises an inlet end and an outlet end connected to the inlet end, the outer body is a L-shaped structure; a first cavity is formed in the inlet end of the outer body, and the valve core platform is located in the first cavity, the valve core is firmly fixed on the valve core platform from the top of the first cavity.

In some embodiments, the control component comprises a screw nut, a semi-circular cover located on the screw nut, and a handle located on the semi-circular cover, the valve core is pressed on the main body component by the screw nut, the semi-circular cover is used to decorate screw nut, the valve core comprises a connecting rod penetrating through the screw nut and the semi-circular cover, and connecting to the handle.

In some embodiments, the connection component locates under the first cavity of the outer body, the connection component comprises a tub, a second gasket and a fast connect screw nut sleeved onto the outside of the tub, the tub is located on the lower part of the first cavity of the outer body, the main body component further comprises a panel and a third gasket located under the panel, the panel and the third gasket sequentially passes through the tub from bottom to top, and the panel presses against the bottom of the outer body.

In some embodiments, the support arm comprises a protrusion and the button comprises a first concave structure corresponding to the protrusion, the protrusion is accommodated in the first concave structure, the support arm comprises a second concave structure for accommodating one end of the switching shaft.

In some embodiments, the switching component comprises a second spring sleeved on an end of the support arm near the second concave structure, and presses the support arm towards to the button.

In some embodiments, the main body component comprises an outer body, a valve core, a valve core platform and inner body located in the outer body, the outer body comprises an inlet end and an outlet end connected to the inlet end, the outer body is a linear structure; a first cavity is formed in the inlet end of the outer body, and the valve core platform is located in the first cavity, the valve core is firmly fixed on the valve core platform from the top of the first cavity.

In some embodiments, the inner body comprises a water inlet part and a water outlet part, the water inlet part and water outlet part form a L-shaped structure, the water inlet part of the inner body inserts into the first cavity and connects to the valve core platform.

In some embodiments, the at least two outlet passages are located in the in the water outlet part.

In some embodiments, main body component further comprises a top cover and a bottom cover, the top cover comprises a storage chamber for accommodating the inner body.

In some embodiments, the bottom cover comprises a downward convex rotation axis, and the downward convex rotation axis inserts into the first cavity of the outer body.

In some embodiments, the main body component comprises a fourth gasket and a C-shaped ring sequentially sleeved on the downward convex rotation axis.

From the above description of the present disclosure, it may be seen that the present disclosure has the following beneficial effects.

First, the switching component of the multifunctional faucet can be used to control the water flowing from the different outlet passages, thereby forming different outflow water flow, and can meet the diverse needs of users.

Second, when the button is released, the pressure on the first spring and the second spring disappear. Force from the second spring and second spring, and a pressure from the water push the switching shaft and sealing element towards the button together quickly, and makes the sealing element automatically reset to the original position. Thus, the multifunctional faucet of the present structure is an automatically reset structure.

Third, the multifunctional faucet of the present disclosure is simple, and it is easy to process and manufacture.

BRIEF DESCRIPTION OF THE DRAWINGS

The accompanying drawings described here are intended to provide a further understanding of the present disclosure and form a part of the present disclosure. The schematic embodiments and explanations of the present disclosure are configured to explain the present disclosure and do not constitute an improper limitation of the present disclosure.

DETAILED DESCRIPTION

Figure 1:
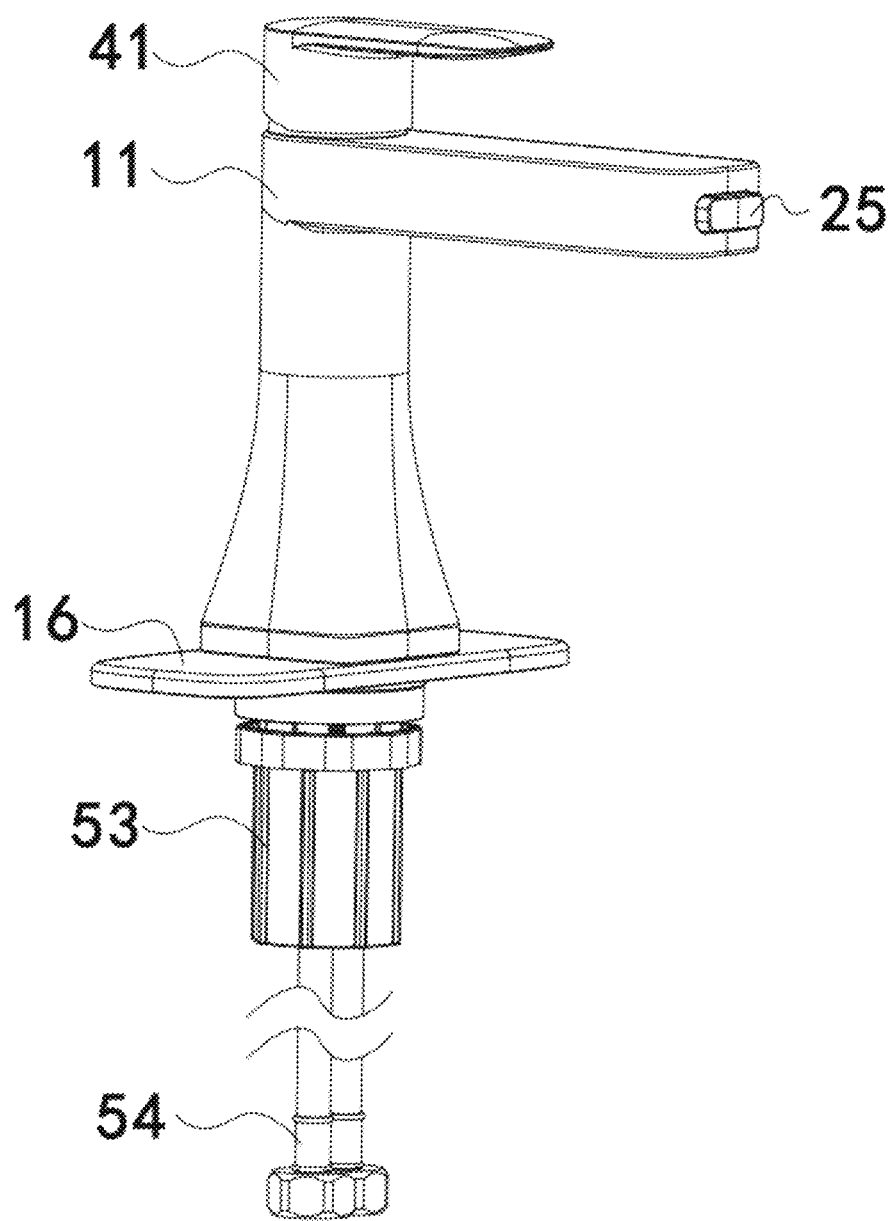
FIG. 1 shows a structural view of a multifunctional faucet of one embodiment.
Figure 2:
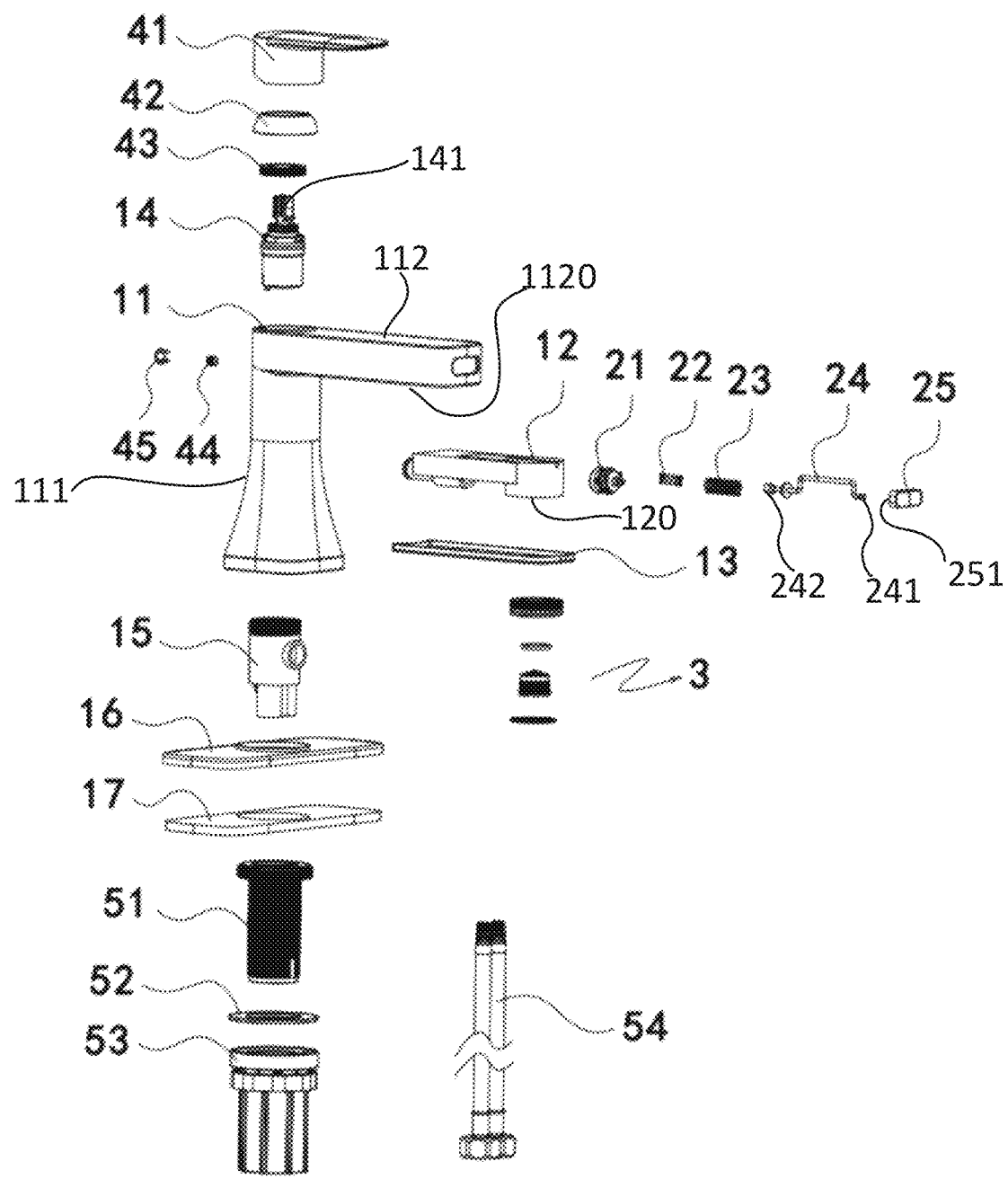
FIG. 2 shows an exploded view of a multifunctional faucet of one embodiment of FIG. 1.
Figure 3:
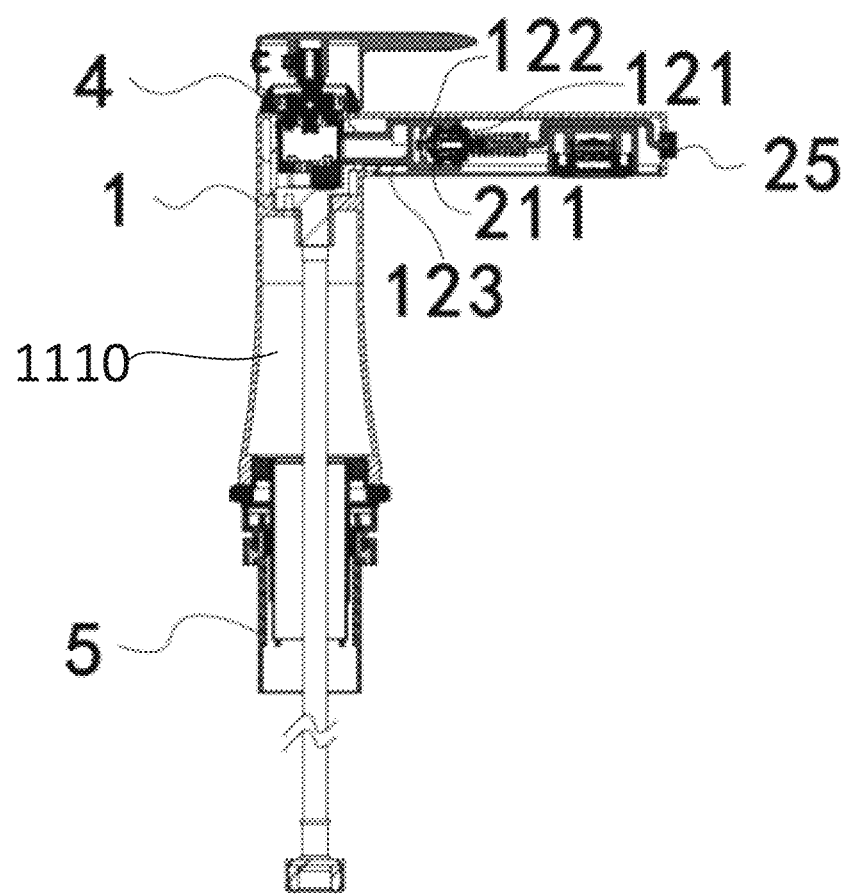
FIG. 3 shows cross-sectional views of a multifunctional faucet of one embodiment of FIG. 1.

In order to make the technical problems, technical solutions, and beneficial effects to be solved by the present disclosure clearer, the present disclosure may be further explained in detail in conjunction with the accompanying drawings and embodiments. It should be understood that the specific embodiments described here are only intended to explain the present disclosure and are not intended to limit the present disclosure.

A multifunctional faucet the of the present embodiment comprises a main body component, a control component located on the main body component, a connection component connected at the bottom of the main body component, and a water outlet component and a switching component located at water outlet of the main body component. The multifunctional faucet can be installed on a bathroom platform by the connection component. The control component can be used to turn on or turn off the multifunctional faucet. The main body component comprises a water passage and at least two outlet passages respectively connected to the water passage. When the multifunctional faucet is turned on by the control component, the switching component controls the water flowing from the water passage to one of the at least two outlet passages and then flowing off of the water outlet component, thereby differing the outflow water flow.

Referring to FIGS. 1 to 8, a multifunctional faucet the of the present embodiment comprises a main body component 1. The main body component 1 comprises an outer body 11, a valve core 14, a valve core platform 15 and inner body 12 located in the outer body 11. The outer body 11 comprises an inlet end 111 and an outlet end 112 connected to the inlet end 111. In one embodiment, the outer body 11 is a L-shaped structure. A first cavity 1110 is formed in the inlet end 111 of the outer body 11, and the valve core platform 15 is located in the first cavity 1110. The valve core 14 is firmly fixed on the valve core platform 15 from the top of the first cavity 1110.

The multifunctional faucet the of the present embodiment further comprises a control component 4. The control component 4 comprises a screw nut 43, a semi-circular cover 42 located on the screw nut 43, and a handle 41 located on the semi-circular cover 42. The valve core 14 is pressed on the main body component 1 by the screw nut 43, so that the valve core 14 can be firmly fixed on the valve core platform 15 to maintain a seal between the valve core 14 and the valve core platform 15 without water leakage. The semi-circular cover 42 can be used to decorate screw nut 43. The valve core 14 comprises a connecting rod 141 penetrating through the screw nut 43 and the semi-circular cover 42, and connecting to the handle 41. In one embodiment, the control component 4 further comprises a second screw 44 and a second cover 45. The connecting rod 141 of the valve core 14 and the handle 41 can be connected and locked by the second screw 44. The second cover 45 can be used to cover and decorate the second screw 44. The structure of the valve core 14 can be selected from the prior art valve core structure. The valve core 14 can be turned on or turn off by operating of the handle 41.

The multifunctional faucet the of the present embodiment further comprises a connection component 5 located under the first cavity 1110 of the outer body 11. The connection component 5 comprises a tub 51, a second gasket 52 and a fast connect screw nut 53 sleeved onto the outside of the tub 51. The tub 51 is located on the lower part of the first cavity 1110 of the outer body 11. The main body component 1 further comprises a panel 16 and a third gasket 17 located under the panel 16. The panel 16 and the third gasket 17 sequentially passes through the tub 51 from bottom to top. And the panel 16 presses against the bottom of the outer body 11. When the multifunctional faucet is installed in an installation hole of a bathroom platform, the panel 16 presses against the bathroom platform, and the gasket 17 seals gaps between the panel 16 and the bathroom platform, and the tub 51 extends below the bathroom platform. Thus, the second gasket 52 and the fast connect screw nut 53 sequentially sleeved on the tub 51 from bottom to top, and the fast connect screw nut 53 threaded connects to the tub 51, and the second gasket 52 seals gaps between the fast connect screw nut 53 and the bottom of the bathroom platform. The connection component 5 further comprises two water inlet pipes 54, the two water inlet pipes 54 pass through the tub 51 and connect to the valve core platform 15.

The outlet end 112 of the outer body 11 further comprises a downward second cavity 1120 which is connected the first cavity 1110. And the inner body 12 is located in the second cavity 1120. So that, the inner body 12 can be connected to the valve core platform 15. The main body component 1 further comprises decoration cover 13, which is used to cover the second cavity 1120.

The inner body 12 comprises two parallel isolated water outlet channels and an active channel arranged in parallel with the water outlet channels. The inner body 12 comprises a water passage located near the first cavity 1110. An end of the water passage is connected to the valve core platform 15, and another end of the water passage is connected to the two parallel isolated water outlet channels. The inner body 12 further comprises a mounting hole 121 located on the two parallel isolated water outlet channels, a water distribution hole 122 and a top wall 123. The top wall 123 is located on the side of the water distribution hole 122 away from the mounting hole 121.

The multifunctional faucet the of the present embodiment further comprises a switching component 2 located on the mounting hole 121 and extend through the active channel to the front surface of the main body component 1. The switching component 2 comprises a water distribution element 21, a switching shaft 26, a first spring 22, a sealing element 28, a button 25 and a support arm 24. The water distribution element 21 is located and fixed between the water passage and the at least two outlet passages. The switching shaft 26 connects to one end of the support arm 24, and movably runs through the water distribution element 21, in order to connect the water passage to one of the least two outlet passages. The first spring 22 is located between the switching shaft 26 and the top wall 123 and presses the switching shaft 26 towards to the button 25. A water passing hole 211 is formed between the water distribution element 21 and the switching shaft 26. The water distribution element 21 is located the mounting hole 121 and is sealed by a sealing ring 27 to prevent water flow from leaking from the gap between the water distribution element 21 and the mounting hole 121. The support arm 24 can be movable located in the active channel. The button 25 is connected on another end of the support arm 24, and protrudes out of the front surface of the main body component 1. When the button 25 is pressed to drive the support arm 24 and the switching shaft 26 to press the first spring 22, and the switching shaft 26 switch the connection between the water passage to one of the least two outlet passages to the connection between the water passage to the other of the least two outlet passages. The sealing element 28 is located on the end of the switching shaft 26 away from the button 25.

In one embodiment, the support arm 24 comprises a protrusion 241 and the button 25 comprises a first concave structure 251 corresponding to the protrusion 241. The protrusion 241 is accommodated in the first concave structure 251, so that the button 25 can be connected to the support arm 24. The support arm 24 comprises a second concave structure 242 for accommodating one end of the switching shaft 26. A gear positon is formed near the second concave structure 242. A second spring 23 is sleeved on an end of the support arm 24 near the second concave structure 242, and further presses the support arm 24 towards to the button 25. An end of the second spring 23 is press on the water distribution element 21. The support arm 24 drives the switching shaft 26, and then the switching shaft 26 drives the sealing element 28 to seal the water passing hole 211 or the water distribution hole 122. When the water passing hole 211 is sealed by the sealing element 28, a first water outlet channel 101 can be turn on, and bubble water can be formed and pass through the first water outlet channel 101. When the water distribution hole 122 is sealed by the sealing element 28, a second water outlet channel 102 can be turn on, and waterfall can be formed and can pass through the second water outlet channel 102.

A water outlet 120 is formed downward on the inner body 12 near the button 25. The water outlet 120 is connected to the first water outlet channel 101 or the second water outlet channel 102, and a water outlet component 3 is formed on the water outlet 120.

Referring to FIGS. 10 to 16, a multifunctional faucet of the another embodiment is provided. The outer body 11 of the multifunctional faucet is a linear structure. A first cavity 1110 is formed from the bottom to the top of the outer body 11. The valve core 14 and the valve core platform 15 are located in the first cavity 1110. The valve core 14 is fixed on the valve core platform 15.

The screw nut 43 presses against the valve core 14 from the side wall and locks the valve core 14 onto the outer body 11. The semi-circular cover 42 and the handle 41 sequentially sleeves onto the connecting rod 141 of the valve core 14 and locks the connecting rod 141 of the valve core 14. The other connections of the control component 4 of this embodiment are the same as that of the control component 4 in the first embodiment, and will not be further elaborated here.

In the present embodiment, the main body component 1 further comprises a snap ring 19, located below the valve core platform 15, and two first screws 190 for locking the snap ring 19. The snap ring 19 comprises two slots 191 corresponding to the two water inlet pipes 54. The two water inlet pipes 54 sequentially passes through the tub 51, inserts into the main body component 1, and then connects to the valve core platform 15 and clamped onto the two slot 191 respectively. The other connections of the connecting component 5 are the same as the first embodiment, and will not be further elaborated here.

Figure 10:
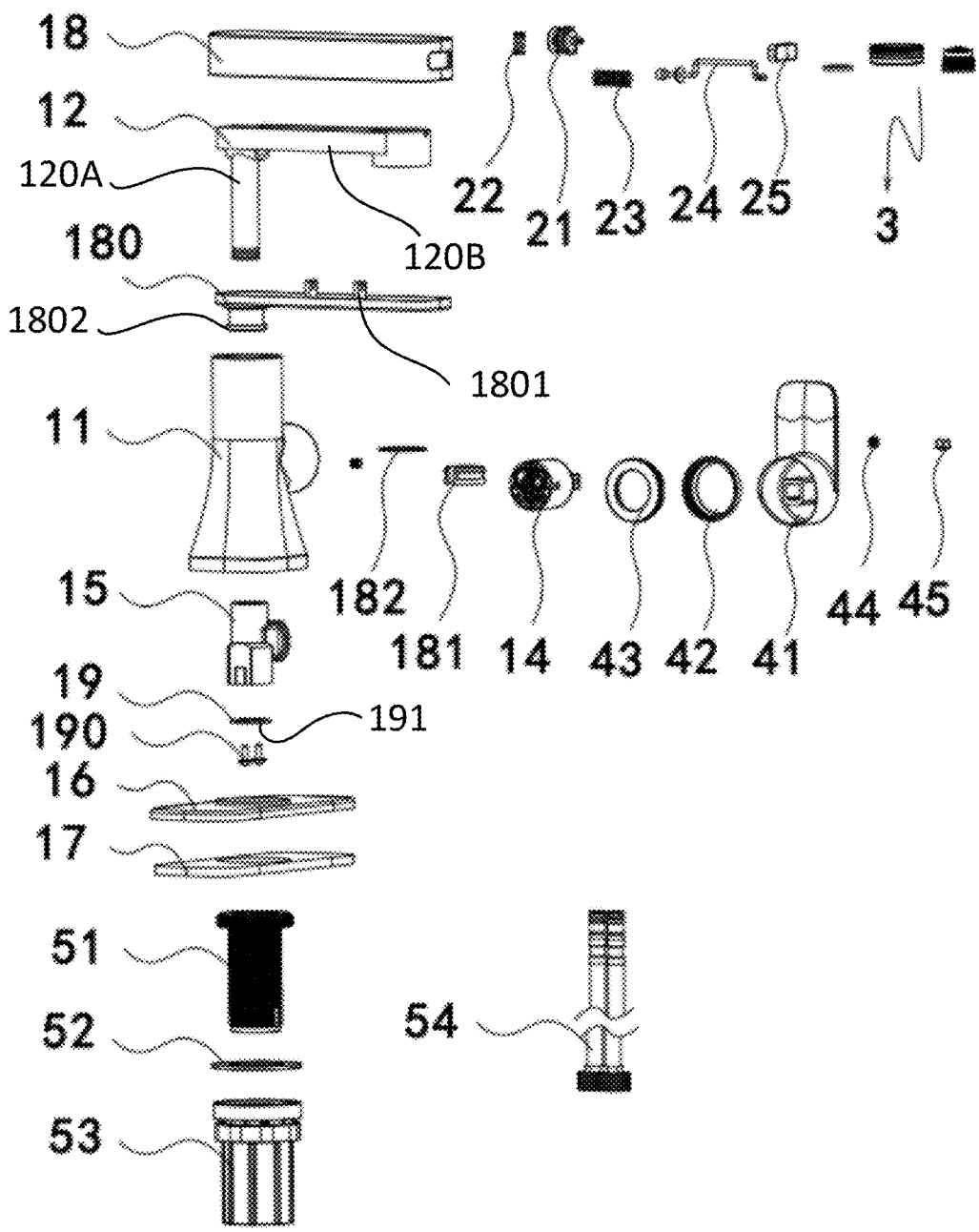
FIG. 10 shows an exploded view of a multifunctional faucet of one embodiment of FIG. 9.
Figure 11:
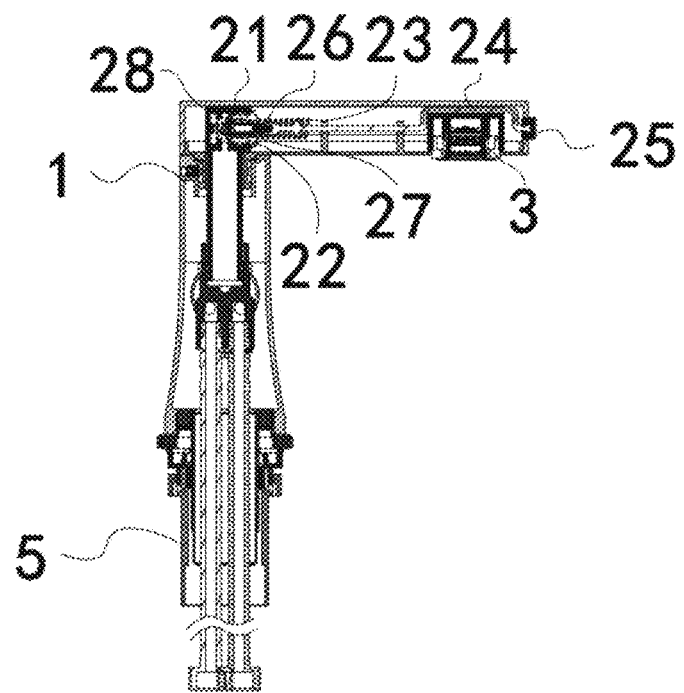
FIG. 11 shows cross-sectional views of a multifunctional faucet of one embodiment of FIG. 9.

Referring to FIG. 10, the inner body 12 comprises a water inlet part 120A and a water outlet part 120B. The water inlet part 120A and water outlet part 120B form a L-shaped structure. The water inlet part 120A of the inner body 12 inserts into the first cavity 1110 and connects to the valve core platform 15. The two parallel isolated water outlet channels, the active channel, the mounting hole 121, the water distribution hole 122 and the top wall 123 are all located in the water outlet part 120B. The water inlet part 120A of the inner body 12 connects with the mounting hole 121 and the water distribution hole 122. The main body component 1 further comprises a top cover 18 and a bottom cover 180. The top cover 18 comprises a storage chamber for accommodating the inner body 12. The bottom cover 180 comprises two protruded slots 1801 spaced with each other, and the support arm 24 is clamped to the two protruded slots 1801. The bottom cover 180 comprises a downward convex rotation axis 1802, and the downward convex rotation axis 1802 inserts into the first cavity 1110 of the outer body 11. The main body component 1 further comprises a fourth gasket 182 and a C-shaped ring 181 sequentially sleeved on the downward convex rotation axis 1802. The fourth gasket 182 and the C-shaped ring 181 make the bottom cover 180 and the outer body 11 space from each other, so that the bottom cover 180 can rotate around the outer body 11 without friction.

Bubble water can be formed and pass through the first water outlet channel 101, and waterfall can be formed and can pass through the second water outlet channel 102, the other structures of the main body component 1 are the same as the first embodiment, and will not be further elaborated here.

Figure 4:
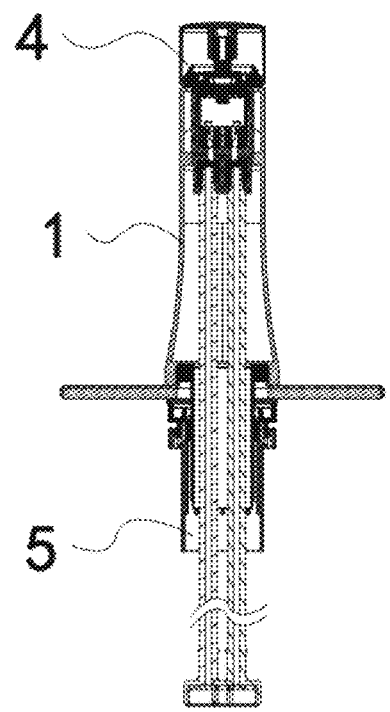
FIG. 4 shows a structural view of a multifunctional faucet of the first state of one embodiment of FIG. 1.
Figure 5:
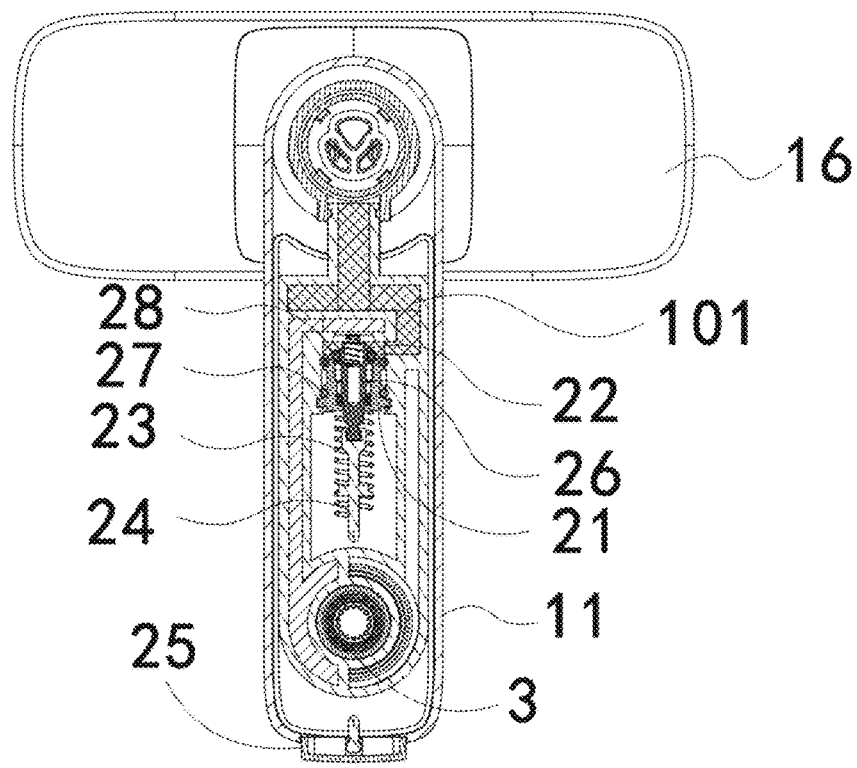
FIG. 5 shows a structural view of a multifunctional faucet of the second state of one embodiment of FIG. 1.
Figure 6:
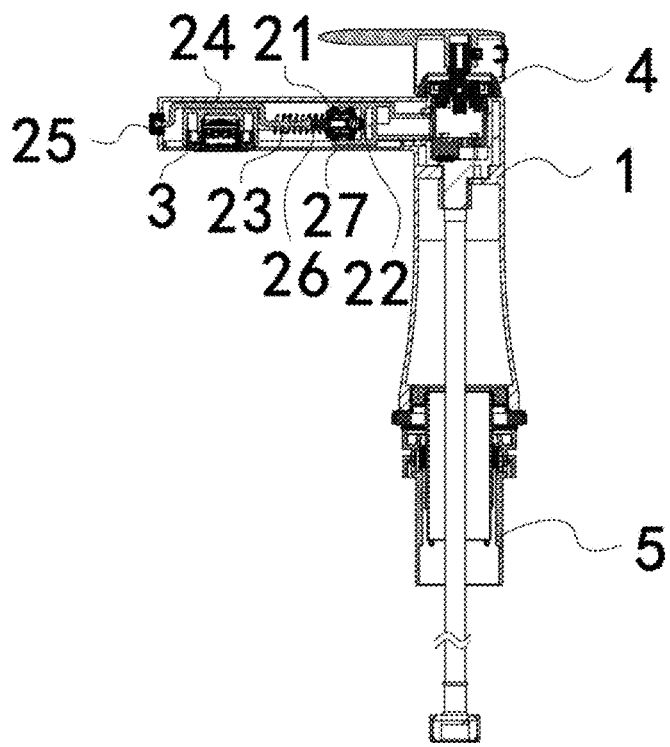
FIG. 6 shows a structural view of a multifunctional faucet of the third state of one embodiment of FIG. 1.
Figure 7:
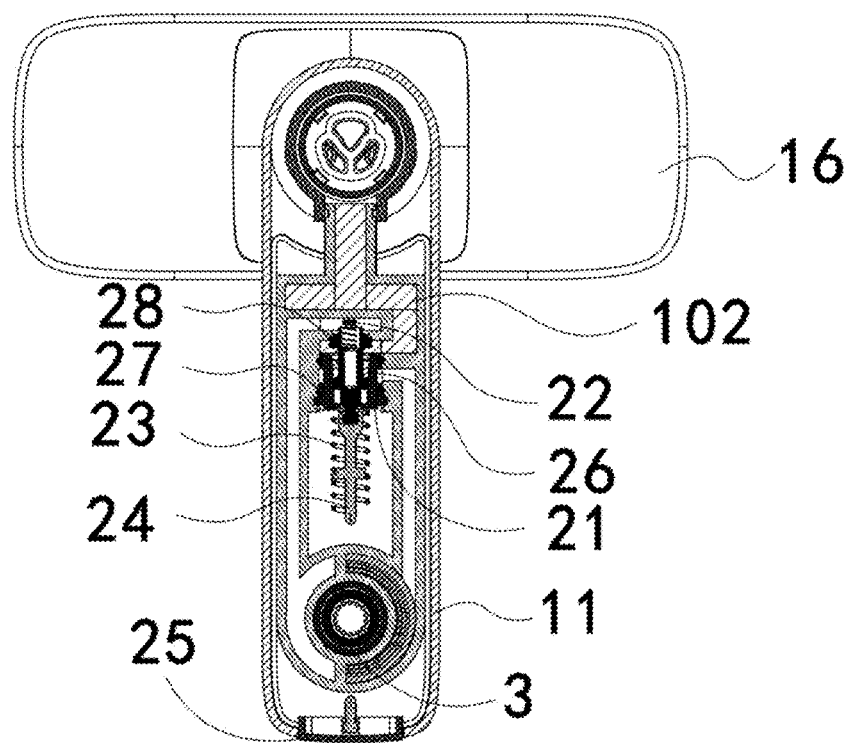
FIG. 7 shows a structural view of a multifunctional faucet of the fourth state of one embodiment of FIG. 1.
Figure 8:
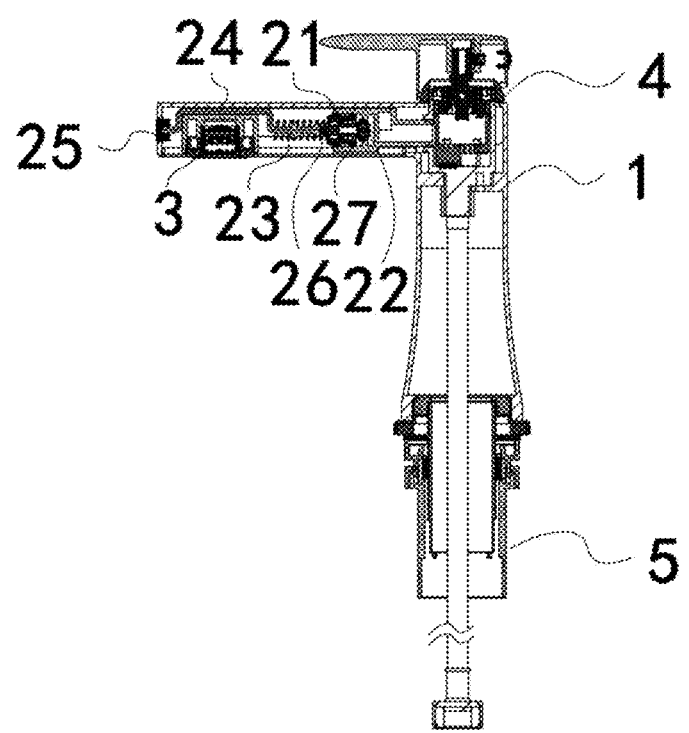
FIG. 8 shows a structural view of a multifunctional faucet of the fifth state of one embodiment of FIG. 1.
Figure 9:
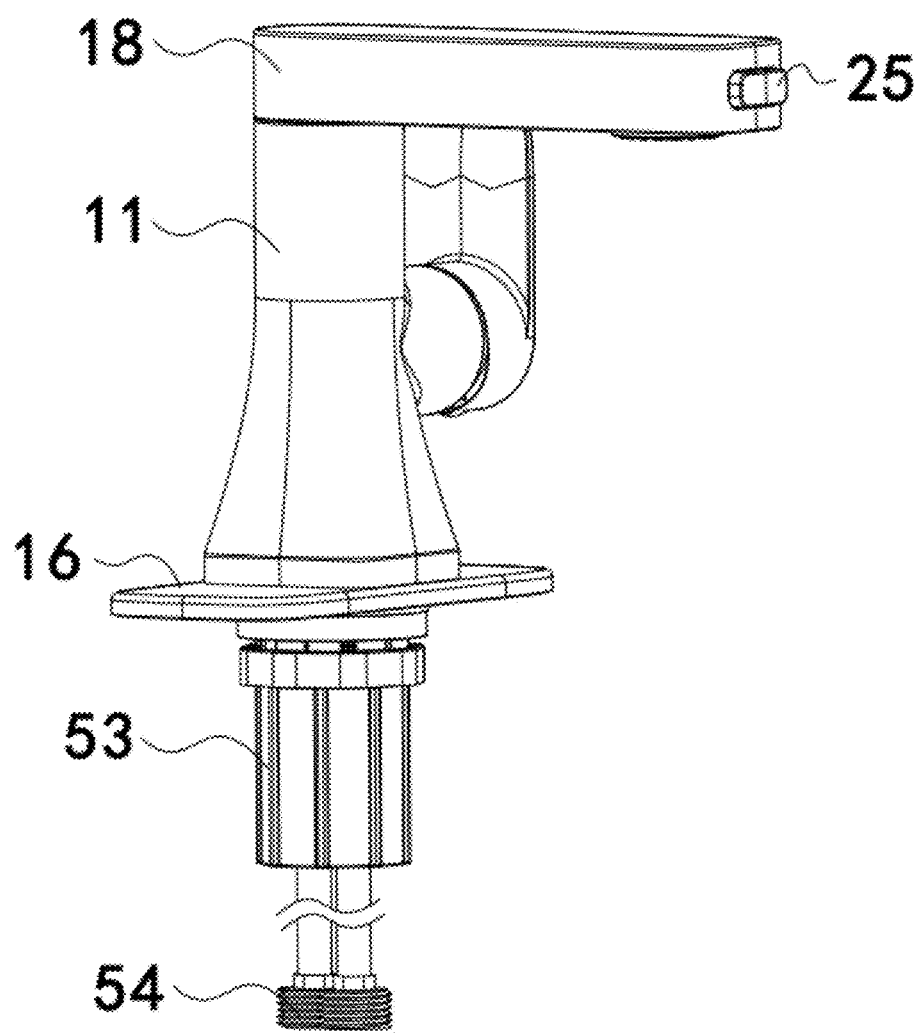
FIG. 9 shows a structural view of a multifunctional faucet of another embodiment.
Figure 12:
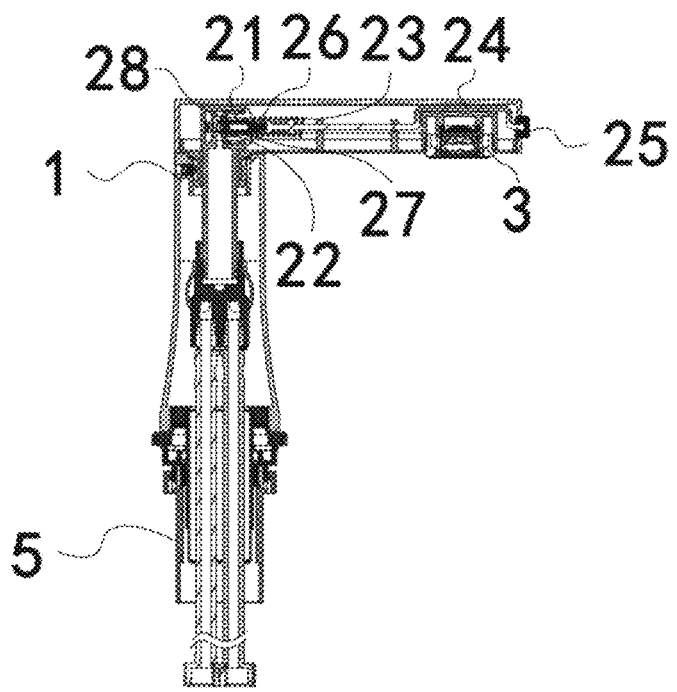
FIG. 12 shows a structural view of a multifunctional faucet of the first state of one embodiment of FIG. 9.
Figure 13:
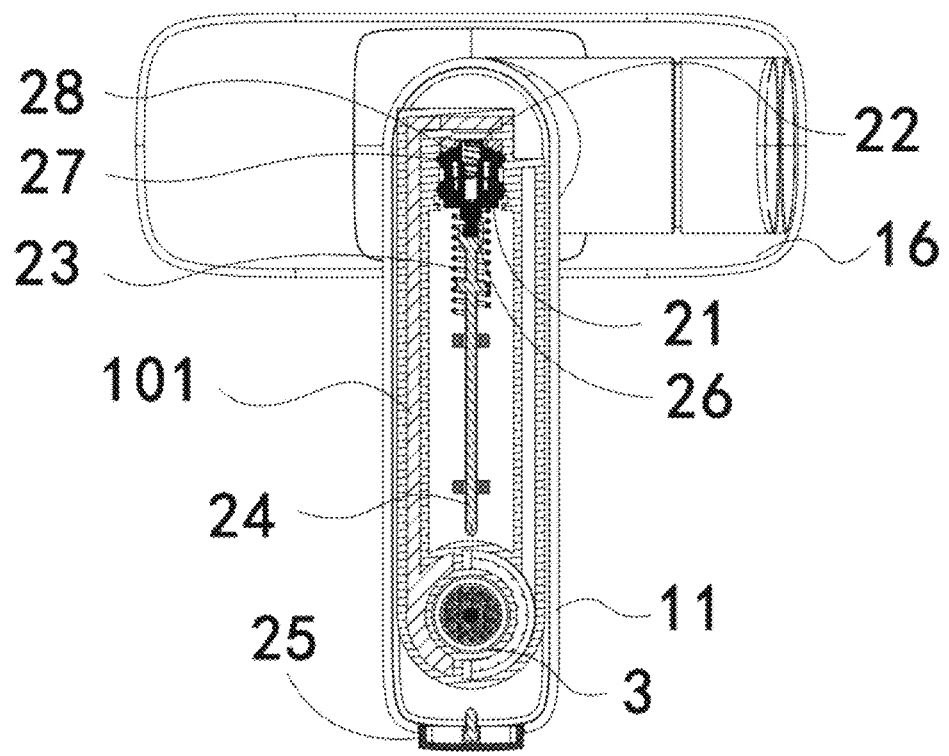
FIG. 13 shows a structural view of a multifunctional faucet of the second state of one embodiment of FIG. 9.
Figure 14:
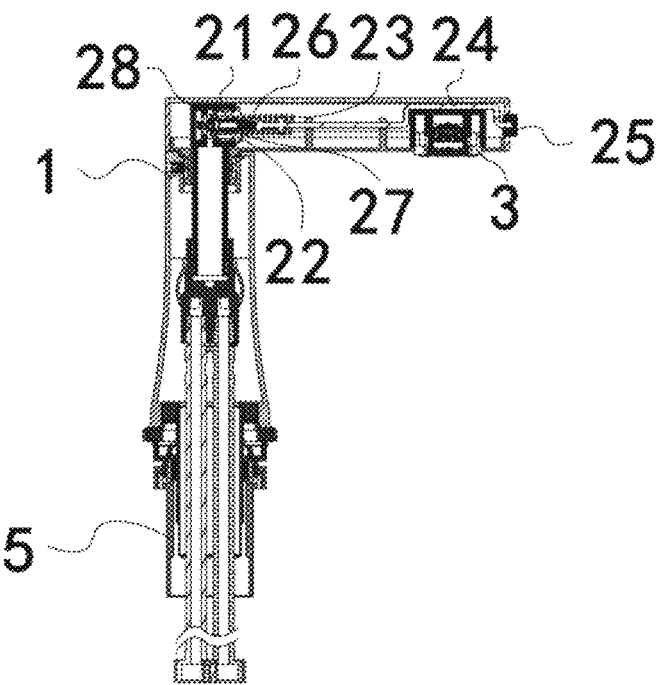
FIG. 14 shows a structural view of a multifunctional faucet of the third state of one embodiment of FIG. 9.
Figure 15:
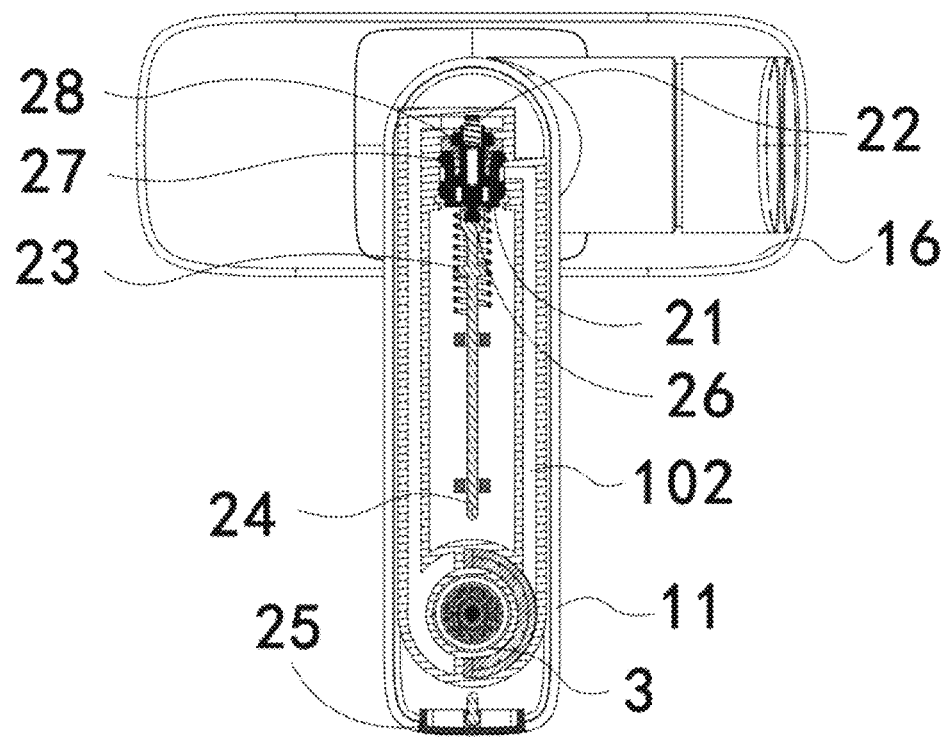
FIG. 15 shows a structural view of a multifunctional faucet of the fourth state of one embodiment of FIG. 9.
Figure 16:
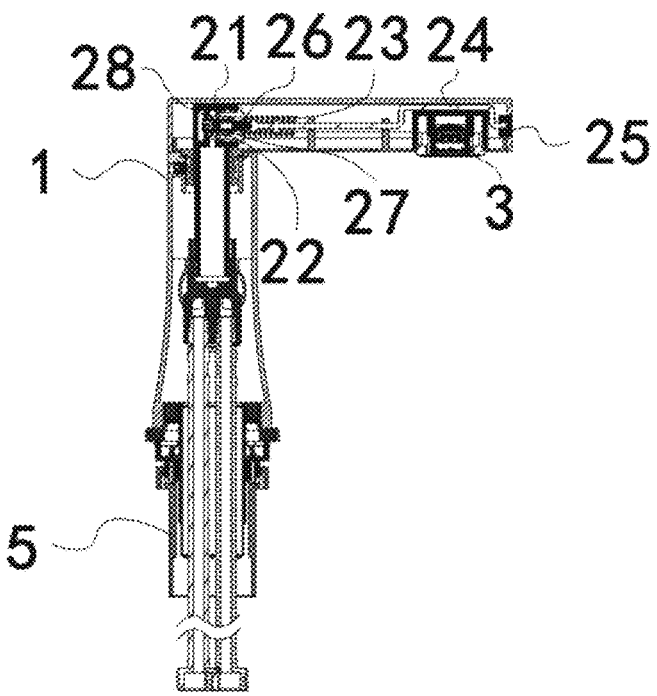
FIG. 16 shows a structural view of a multifunctional faucet of the fifth state of one embodiment of FIG. 9.

Referring to FIGS. 4 and 12, an end of the two water inlet pipes 54 connects to the cold water and hot water respectively, and the other end of the two water inlet pipes 54 connects to valve core platform 15 respectively. When the valve core 14 is turned on, the cold water and hot water mix and then enter into the inner body 12.

Referring to FIGS. 5-6 and 13-14, the switching shaft 26 remains pressing to the button 25 by elastic force of the first spring 22 and the water pressure. Thus, the sealing element 28 seals the water passing hole 211, and the first water outlet channel 101 can be turned on.

Referring to FIGS. 7-8 and 15-16, when the button 25 is pressed on, a pressure is passed by the support arm 24 to compress the second spring 23. At the same time, the first spring 22 is also compressed by the support arm 24. Thus, the switching shaft 26 moves far away from the button 25, and makes the sealing element 28 moving from the water passing hole 211 to the water distribution hole 122, therefore, the second water outlet channel 102 can be turned on.

When the button 25 is released, the pressure on the first spring 22 and the second spring 23 disappear. Force of the second spring 23 and the first spring 22 pushes the switching shaft and the sealing element towards the button 25, and makes the sealing element 28 moving from the water distribution hole 122 to the water passing hole 211, therefore, the first water outlet channel 101 can be turned on automatically.

The above exemplary description of the present disclosure is provided in conjunction with the accompanying drawings. It is evident that the specific implementation of the present disclosure is not limited by the aforementioned modes. As long as various non substantial improvements are made using the method concept and technical solutions of the present disclosure, or when the concept and technical solutions of the present disclosure are directly applied to other occasions without improvement, they are all within the scope of protection of the present disclosure.

What is claimed is:

1. A multifunctional faucet, comprising:
a main body component, a control component located on the main body component, a connection component connected at the bottom of the main body component, a water outlet component, and a switching component located at water outlet of the main body component;
the main body component, comprising a water passage and at least two outlet passages respectively connected to the water passage;
the control component is used to turn on or turn off the multifunctional faucet;
when the multifunctional faucet is turned on by the control component, the switching component controls the water flowing from the water passage to one of the at least two outlet passages and then flowing out of the water outlet component, thereby differing the outflow water flow;
wherein the switching component comprises a button, a support arm, a water distribution element, a switching shaft, a first spring and a sealing element; the button connects to one end of the support arm, and protrudes out of the main body component; the water distribution element is located and fixed between the water passage and the at least two outlet passages; the sealing element is located on the end of the switching shaft away from the button; the switching shaft connects to other end of the support arm, and movably runs through the water distribution element in order to connect the water passage to one of the least two outlet passages; the first spring presses the switching shaft towards to the button.

2. The multifunctional faucet according to claim 1, wherein the main body component comprises an outer body, a valve core, a valve core platform and inner body located in the outer body, the outer body comprises an inlet end and an outlet end connected to the inlet end, the outer body is a L-shaped structure; a first cavity is formed in the inlet end of the outer body, and the valve core platform is located in the first cavity, the valve core is firmly fixed on the valve core platform from the top of the first cavity.

3. The multifunctional faucet according to claim 2, wherein the control component comprises a screw nut, a semi-circular cover located on the screw nut, and a handle located on the semi-circular cover, the valve core is pressed on the main body component by the screw nut, the semi-circular cover is used to decorate screw nut, the valve core comprises a connecting rod penetrating through the screw nut and the semi-circular cover, and connecting to the handle.

4. The multifunctional faucet according to claim 3, wherein the connection component locates under the first cavity of the outer body, the connection component comprises a tub, a second gasket and a fast connect screw nut sleeved onto the outside of the tub, the tub is located on the lower part of the first cavity of the outer body, the main body component further comprises a panel and a third gasket located under the panel, the panel and the third gasket sequentially passes through the tub from bottom to top, and the panel presses against the bottom of the outer body.

5. The multifunctional faucet according to claim 1, wherein the support arm comprises a protrusion and the button comprises a first concave structure corresponding to the protrusion, the protrusion is accommodated in the first concave structure, the support arm comprises a second concave structure for accommodating one end of the switching shaft.

6. The multifunctional faucet according to claim 5, wherein the switching component comprises a second spring sleeved on an end of the support arm near the second concave structure, and presses the support arm towards to the button.

7. The multifunctional faucet according to claim 1, wherein the main body component comprises an outer body, a valve core, a valve core platform and inner body located in the outer body, the outer body comprises an inlet end and an outlet end connected to the inlet end, the outer body is a linear structure; a first cavity is formed in the inlet end of the outer body, and the valve core platform is located in the first cavity, the valve core is firmly fixed on the valve core platform from the top of the first cavity.

8. The multifunctional faucet according to claim 7, wherein the inner body comprises a water inlet part and a water outlet part, the water inlet part and water outlet part form a L-shaped structure, the water inlet part of the inner body inserts into the first cavity and connects to the valve core platform.

9. The multifunctional faucet according to claim 8, wherein the at least two outlet passages are located in the in the water outlet part.

10. The multifunctional faucet according to claim 9, wherein main body component further comprises a top cover and a bottom cover, the top cover comprises a storage chamber for accommodating the inner body.

11. The multifunctional faucet according to claim 10, wherein the bottom cover comprises a downward convex rotation axis, and the downward convex rotation axis inserts into the first cavity of the outer body.

12. The multifunctional faucet according to claim 11, wherein the main body component comprises a fourth gasket and a C-shaped ring sequentially sleeved on the downward convex rotation axis.

* * * * *